(12) United States Patent
Sugawara et al.

(10) Patent No.: US 6,180,174 B1
(45) Date of Patent: Jan. 30, 2001

(54) PROCESS FOR THE PRODUCTION OF A COATED COPPER ALLOY

(75) Inventors: Akira Sugawara; Yoshitake Hana, both of Toyooka-mura; Takayoshi Endo; Osamu Sugiyama, both of Haibara-gun, all of (JP)

(73) Assignees: Dowa Mining Co., Ltd.; Yazaki Corporation, both of Tokyo (JP)

(*) Notice: Under 35 U.S.C. 154(b), the term of this patent shall be extended for 0 days.

(21) Appl. No.: 09/432,675

(22) Filed: Nov. 2, 1999

Related U.S. Application Data

(62) Division of application No. 08/890,387, filed on Jul. 9, 1997.

(30) Foreign Application Priority Data

Jul. 11, 1996 (JP) .................................................. 8-201077

(51) Int. Cl.[7] .............................. B05D 3/02; B05D 1/36; B05D 1/18; C25D 5/52; C25D 5/50
(52) U.S. Cl. ...................... 427/376.3; 427/405; 427/433; 205/222; 205/224; 205/225; 428/647
(58) Field of Search .................................. 427/405, 376.8, 427/433; 428/647; 148/559, 679; 205/222, 224, 225

(56) References Cited

U.S. PATENT DOCUMENTS

| 3,892,637 | 7/1975 | Polti .................................... 204/37 T |
| 4,348,263 | 9/1982 | Draper et al. .......................... 204/29 |
| 5,334,814 | 8/1994 | Nosetani et al. ...................... 219/119 |

*Primary Examiner*—Paul Thibodeau
*Assistant Examiner*—Holly Rickman
(74) *Attorney, Agent, or Firm*—Frishauf, Holtz, Goodman, Langer & Chick, P.C.

(57) ABSTRACT

The invention provides a process for producing a coated Cu alloy having a surface which has a low coefficient of friction and a high resistance to abrasion and is suitable for fabricating connectors, charging-sockets of electric automobiles etc. The coated Cu alloy is produced by coating the surface of a copper alloy with Sn and heat treating the coated Cu alloy at a temperature in the range of 100–450° C. for 0.5–24 hours. The Cu alloy which is coated with Sn consists of 1–41 wt % Zn with the balance being Cu and incidental impurities. By using the coated Cu alloy, the force of insertion, resistance to abrasion and resistance to corrosion of connectors can be significantly improved.

19 Claims, 3 Drawing Sheets

PROCESS FOR THE PRODUCTION OF A COATED COPPER ALLOY

This application is a Division of Ser. No. 08/890,387 filed Jul. 9, 1997.

BACKGROUND OF THE INVENTION

1. Field of the Invention

This invention relates to copper alloys and a process for the production thereof. The term "copper alloys" herein used includes in the strict sense both copper and copper alloys. However, either one of them will simply be referred to as this term hereunder. In particular, the invention relates to copper alloys that can provide surfaces having improved characteristics suitable for the production of various types of electrical parts, such as, a surface exhibiting decreased friction during insertion and drawing, for example, a surface of a multi-pin connector used for electric wiring in an automobile production; a surface of a charging-socket of an electric automobile which is used repeatedly a great number of times in insertion and drawing; a surface of a brush which is used in contact with a rotating body such as an electric motor and therefore is required to be highly resistant to abrasion; and a surface of a battery terminal which is also required to be highly resistant to abrasion and corrosion. The invention also relates to a process for the production of copper alloys referred to above.

2. Background Information

With the recent development of the electronics industry, electric wiring in various machines is becoming more and more complicated and highly integrated, and this has caused use of connectors having an increased number of pins. Conventional connectors having Sn-plated surfaces have encountered a problem in that the practical use thereof is becoming more and more difficult because of the increased friction at the times of insertion and drawing.

Currently available electric automobiles require charging at least once a day. Thus, it is necessary that a charging-socket is highly resistant to abrasion. In addition, since a large amount of electric current such as 10A or more flows in sockets and therefore a large amount of heat is generated, a new problem that Sn-plated surfaces of sockets obtained by a conventional method cannot withstand the delamination of the plated surface has occurred.

A deeper understanding has been acquired with respect to the fact that the above-stated problems cannot be solved by conventional surface treatment methods. A method of the kind of the present invention was also among the conventional methods, which comprises the steps of applying heat treatment to a copper alloy and subsequently causing heat diffusion in the alloy. However, the conventional method was no more than the method for only preventing the separation or peeling off, due to the influence of working or heat, of the surface treated layer from the alloy body by making use of the diffusion between the surface treated layer and the matrix. For this reason, the stated problems could not be solved by said prior art method.

SUMMARY OF THE INVENTION

The present invention has been accomplished to solve the above-mentioned problems, and provides a copper alloy and a process for the production thereof. The process of the invention comprises the steps of coating the surface of a copper alloy material with Sn or an Sn-alloy coating followed by applying heat treatment to the coated surface, thereby forming in the surface treated layer on said material a very hard coating containing Cu—Sn system intermetallic compounds ($Cu_3Sn$, $Cu_4Sn$ etc.) and Cu—Sn—Zn system Intermetallic compounds. By doing this, the present invention provides a copper alloy having a surface which is suitable when used as a connector or as a charging-socket of an electric automobile because of its having a low coefficient of friction and high resistance to abrasion.

The present invention has been accomplished based on the finding that the surface hardness can be increased greatly by having a specified thickness of an Sn layer coated on a Cu alloy having a specified composition and also utilizing specified heat treating conditions. This enables formation of Cu—Sn system intermetallic compounds ($Cu_3Sn$, $Cu_4Sn$ etc.) and Cu—Sn—Zn system intermetallic compounds, whereby the Vickers hardness (Hv) of the coated surface can be increased to 300 or more, preferably 400 or more, which is remarkably higher than the hardness of Sn-plated surfaces (60 to 120) or that of matrix (80 to 250); thus the invention provides a copper alloy and a process for the production of the alloy which has electrical and working characteristics suitable for making connectors of an automobile and charging-sockets of an electric automobile, having a surface with a low coefficient of friction and superior resistance to abrasion.

In one aspect, the invention provides a coated copper alloy having a surface coating of Sn wherein said copper alloy consists essentially of 1–41 wt % Zn with the balance being Cu and incidental impurities, said surface coating is formed by surface treating said copper alloy with Sn, followed by heat treating the Sn coated copper alloy to cause heat diffusion so as to form a surface coating consisting essentially of Cu and Sn, said surface coating extending to the depth which includes at least the interface between said Sn layer and said copper alloy.

In another aspect, the invention provides a coated copper alloy having a surface coating of Sn wherein said copper alloy consists essentially of 1–41 wt % Zn, 0.01–9 wt % in total of one or two or more elements selected from the group consisting of Fe, Ni, Sn, Al, Co, Ti, Cr, Mg, Si and P with the balance being Cu and incidental impurities, said Sn coating is formed by surface treating said copper alloy with Sn, followed by heat treating the Sn coated copper alloy to cause heat diffusion so as to form a surface coating consisting essentially of Cu and Sn, said surface coating extending to the depth which includes at least the interface between said Sn layer and said copper alloy.

The surface coating has a Vickers hardness of at least 300 and preferably of more than 400.

The invention also provides electrical parts made from the coated Cu alloys of the present invention.

The invention further provides electrical connector terminals made from the coated Cu alloys of the present invention.

The invention also provides a process for the production of a coated Cu alloy comprising the steps of coating with Sn the surface of a Cu alloy consisting essentially of 1–41 wt % Zn with the balance being Cu and incidental impurities, and applying heat treatment to the Sn coated Cu alloy at a temperature between 100 and 450° C., preferably between 200 and 400° C., for 0.5 to 24 hours, preferably for 1 to 3 hours.

The invention further provides a process for the production of a coated Cu alloy comprising the steps of coating with Sn the surface of a Cu alloy consisting essentially of 1–41 wt % Zn and 0.01–9 wt % in total of one or two or more elements selected from the group consisting of Fe, Ni, Sn, Al, Co, Ti, Cr, Mg, Si and P, with the balance being Cu and incidental impurities, and applying heat treatment to the Sn coated Cu alloy at a temperature between 100 and 450° C., preferably between 200 and 400° C., for 0.5 to 24 hours, preferably for 1 to 3 hours.

The thickness of the Sn coating of the above-mentioned coated Cu alloys should be in the range of 0.5–10 μm, preferably 1–5 μm.

The surface roughness (Rmax) of the above-mentioned coated Cu alloys should be 3 μm or less.

The heat treatment in the process of the invention can also be effected stepwise at two or more different temperatures, so long as each treating temperature is within the specified range and total treating time is within the specified period of time.

DETAILED DESCRIPTION OF THE INVENTION

Figure 1:
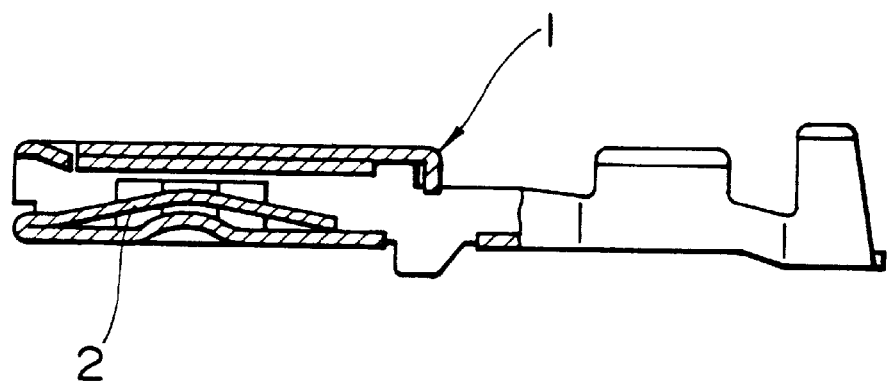
FIG. 1 is a schematic side view partially having cross sections of a female connector terminal having a spring portion fabricated from the coated Cu alloy of the present invention.

We now describe the reason why the selected elements are to be added to copper alloys according to the present invention and the criticality of the compositional ranges of these alloys.

(1) Zinc (Zn) dissolves in the Cu matrix to provide improved strength, elasticity and workability. Zn has not only the ability to further improve the weather fastness of the plated surface of the Cu alloy, but also the other advantages inclusive of the weight reduction of the alloy due to its low specific gravity, and the economical merit due to its inexpensiveness. However, if the Zn content exceeds 41 wt %, β phase is markedly increased and there occurs a marked reduction in cold workability, electrical conductivity and the resistance to stress corrosion cracking. The Zn content, therefore, should be in the range of 1–41 wt %.

(2) Auxiliary Components

One or two or more elements selected from the group consisting of Fe, Ni, Sn, Al, Co, Ti, Cr, Mg, Si and P, may be added in an amount of 0.01–9 wt % in total. The incorporation of these elements is effective in improving strength, elasticity and workability of the copper alloys of the present invention without decreasing the electrical conductivity of the copper alloy. These elements also diffuse through the diffusion layer of Cu—Sn system intermetallic compounds ($Cu_3Sn$, $Cu_4Sn$ etc.) and Cu—Sn—Zn system intermetallic compounds, thereby increasing the hardness of the alloy without increasing the contact resistance.

The contents of these auxiliary components should be in the ranges given below for the reasons of assuring good electrical conductivity, good shaping workability or realizing easy producibility.

Fe: 0.01–5 wt %, Ni: 0.01–9 wt %, Sn: 0.11–9 wt %, Al: 0.01–9 wt %,

Co: 0.01–5 wt %, Ti: 0.01–5 wt %, Cr: 0.01–5 wt %, Mg: 0.01–3 wt %,

Si: 0.01–3 wt %, P: 0.01–0.5 wt %.

The copper alloys prepared in accordance with the present invention are not only superior in strength and workability but also inexpensive. These copper alloys are subjected to surface treatment with Sn followed by heat diffusion; thus, there is provided, in the surface layer of the alloy, an effective formation of intermetallic compounds consisting mainly of Cu—Sn system or Cu—Sn—Zn system. The reason for restricting the thickness of Sn coating and the conditions for heat treatment will be explained below.

If the thickness of Sn coating is less than 0.5 μm, there will be a loss of resistance to corrosion. Particularly, corrosion by $H_2S$ or $SO_2$ or stress corrosion cracking, due to gaseous $NH_3$ in the presence of moisture may sometimes become a serious problem. If the thickness of Sn coating exceeds 10 μm, the diffusion layer will become too thick to prevent cracking during the step of working. As is represented by the stated trouble, the decrease in formability and workability is observed. In addition, fatigue characteristics will decrease and the problem of economical disadvantage will occur. Accordingly, the thickness of Sn coating is specified to range from 0.5 to 10 μm, more preferably from 1 to 5 μm. A pretreatment such as Cu plating may be applied beneath Sn coating. The Cu layer beneath Sn coating serves to form Cu—Sn system intermetallic compounds and is effective in preventing an excessive diffusion of Zn and other added elements. If the Cu layer beneath Sn coating is too thick, the diffusion layer will become too thick, thus deteriorating workability of the alloy. Therefore, the preferred thickness of the Cu layer beneath Sn coating should be 10 μm or less.

As regards the means to form Sn coating, electrical plating and molten metal dipping are preferred in order to obtain a strongly adhered uniform coating layer. As regards Sn to be used for coating, it may be a Sn—Pb alloy whose Sn content is 50% or more. If the Pb content exceeds 50%, it will be difficult to obtain a required hardness because of the presence of Pb in the surface layer after heat diffusion.

If the heat treatment is effected at a temperature lower than 100° C., it will take too much time to diffuse Sn; thus the treatment will become disadvantageous from a viewpoint of economy. If it is effected at a temperature exceeding 450° C., a Cu alloy as the parent material will soften in a short time and the strength, elasticity and hardness will be reduced. If the treatment time is less than 0.5 hour, diffusion of Sn will be insufficient and effective formation of an intermetallic compound cannot be attained. If it exceeds 24 hours, the treatment will become economically disadvantageous and production efficiency will also be impaired.

Thus, heat treatment conditions should be as follows. Preferably, it should be effected at a temperature in the range of 100–450° C. for a period of time in the range of 0.5–24 hours; more preferably it should be effected at a temperature in the range of 200–400° C. for a period of time in the range of 3–10 hours. Heat treatment may be effected stepwise at different temperatures by shifting the temperature from a lower temperature to a higher temperature in several stages. Particularly, a sequential treatment at temperatures in the ranges of 100–300° C. and 300–450° C. is preferred. This way of practicing is efficacious not only for forming a diffusion layer but also for preventing the parent material from softening.

After heat treatment, the oxide film formed on the surface is preferably removed by chemical treatment such as pickling or by mechanical treatment such as buffing or barrel polishing. By this removal of the surface film, further reduction in the force of insertion and further improvement in contact resistance and soldering characteristics can be expected. The surface film is preferably removed within the range of 0.01–2 μm from the outer surface level.

The surface roughness in terms of Rmax after heat diffusion is generally 3–10 μm, but this value can be reduced to less than 3 μm by applying the above-mentioned treatments. Therefore, the surface roughness is preferably reduced to less than 3 μm. If the surface roughness exceeds 3 μm, an electrical part fabricated from the alloy may require a larger force for inserting the part when it is used. The surface roughness can be adjusted either by chemical treatment such as pickling or by mechanical treatment such as buffing as stated above.

The invention will be explained in more detail by referring to the following examples. The present invention is not limited to these examples.

EXAMPLE 1

Copper alloy Nos. 1–9 (invention alloys) and No. 10 (comparative alloy) that had the chemical compositions (wt %) shown in Table 1 were rolled to sheets having the thickness of 0.3 mm, followed by coating with Sn by means of electroplating effected in a sulfuric acid bath. The respective Sn-plated alloys were subjected to heat treatment under the following conditions: Sn coating thickness, 2.5 μm; heat treating temperature, 325° C.; treating time, 8 hours.

Using the samples thus prepared, the hardness, tensile strength and electrical conductivity of each sheet were measured in accordance with JIS-Z-2244, JIS-Z-2241 and JIS-H-0505, respectively.

For evaluating the amenability to bending work, a 90° W bend test was conducted (CES-M-0002-6, R=0.2 mm, in both the rolling direction and a direction normal thereto); specimens having a satisfactory surface in the central ridge were rated "○", those in which wrinkles occurred were rated "Δ", and those in which cracks occurred were rated "X". The results are collectively shown in Table 2.

Figure 2:
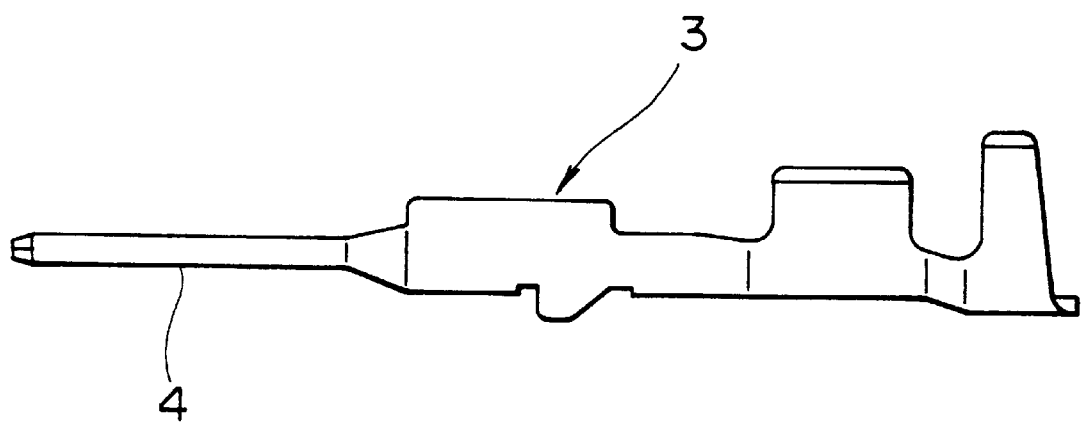
FIG. 2 is a schematic side view of a male connector terminal fabricated from the coated Cu alloy of the present invention.

As one can see from Table 2, copper alloy Nos. 1–9 within the scope of the invention were significantly improved in the surface hardness; had a good balance between tensile strength and electrical conductivity, while exhibiting high amenability to bending work. Thus, the invention alloys proved to have highly superior characteristics suitable for use in connectors, charging-sockets etc. Typical connectors for which the coated Cu alloys of the present invention are useful are shown in FIGS. 1 and 2. In contrast, alloy No. 10 which is outside the scope of the present invention was found to be inferior in formability and workability and to be inappropriate as a material for fabricating the electrical parts which are required to have good workability.

TABLE 1

| Alloy No. | Composition (wt %) | | |
|---|---|---|---|
| | Zn | Other elements added | Balance |
| 1 | 4.9 | — | Cu |
| 2 | 30.2 | — | Cu |
| 3 | 35.3 | — | Cu |
| 4 | 40.6 | — | Cu |
| 5 | 4.2 | Fe: 0.14, Sn: 1.03, P: 0.05 | Cu |
| 6 | 4.1 | Fe: 0.18, Sn: 1.94, P: 0.04 | Cu |
| 7 | 4.2 | Sn: 7.90, P: 0.186 | Cu |
| 8 | 4.3 | Mg: 0.20, P: 0.09 | Cu |
| 9 | 1.9 | Al: 0.15, Cr: 0.18 | Cu |
| 10* | 46.6 | | Cu |

*Alloy No. 10 is out of the scope of the present invention.

TABLE 2

| Alloy No. | | Surface Hardness (Hv) | Tensile Strength (N/mm$^2$) | Elongation (%) | Electrical Conductivity (% IAC) | 90° Bend |
|---|---|---|---|---|---|---|
| 1 | Bfr | — | 381 | 9.8 | 57 | ○ |
|   | Aft | 507 | 390 | 10.2 | 56 | Δ |
| 2 | Bfr | — | 519 | 12.8 | 27 | ○ |
|   | Aft | 516 | 531 | 10.7 | 27 | Δ |
| 3 | Bfr | — | 505 | 12.6 | 28 | ○ |
|   | Aft | 507 | 525 | 11.5 | 27 | Δ |
| 4 | Bfr | — | 535 | 9.9 | 28 | ○ |
|   | Aft | 512 | 530 | 8.9 | 28 | Δ |
| 5 | Bfr | — | 491 | 7.2 | 44 | ○ |
|   | Aft | 505 | 480 | 6.8 | 43 | Δ |
| 6 | Bfr | — | 589 | 9.3 | 23 | ○ |
|   | Aft | 520 | 597 | 8.2 | 23 | Δ |
| 7 | Bfr | — | 672 | 17.9 | 12 | ○ |
|   | Aft | 498 | 681 | 6.8 | 12 | Δ |
| 8 | Bfr | — | 526 | 6.7 | 52 | ○ |
|   | Aft | 517 | 523 | 5.3 | 52 | Δ |
| 9 | Bfr | — | 405 | 10.2 | 74 | ○ |
|   | Aft | 470 | 381 | 15.1 | 74 | Δ |
| 10 | Bfr | — | 591 | 5.3 | 23 | X |
|   | Aft | 509 | 578 | 3.2 | 22 | X |

Bfr: Before heat treatment.
Aft: After heat treatment.
Alloy No. 10 is out of the scope of the present invention.

EXAMPLE 2

Alloy No. 2 of the present invention was subjected to testing of hardness, tensile strength, electrical conductivity and amenability to bending work in the same manner as in Example 1 under the conditions where the thickness of plating and heat treating temperature were changed. The results are shown in Table 3.

Table 3 indicates that the surface hardness was markedly improved by applying heat treatment after surface treatment, and that further improvement in characteristics of the alloy may be expected by tuning the conditions. Therefore, the alloy of the present invention proved to have superior characteristics as a copper alloy for use in fabricating connectors and charging-sockets.

TABLE 3

| Alloy No. | Treating Temperature, (° C.) | Plated Film Thickness (μm) | Surface Hardness (Hv) | Tensile Strength (N/mm$^2$) | Electrical Conductivity (% IACS) | 90° Bend | |
|---|---|---|---|---|---|---|---|
| 2 | Bfr | 5.0 | 78 | 519 | 27 | ○ | * |
| 2 | 700 | 5.0 | 521 | 335 | 27 | Δ | * |
| 2 | 325 | 2.0 | 487 | 527 | 28 | Δ | |

TABLE 3-continued

| Alloy No. | Treating Temperature, (° C.) | Plated Film Thickness (μm) | Surface Hardness (Hv) | Tensile Strength (N/mm²) | Electrical Conductivity (% IACS) | 90° Bend |
|---|---|---|---|---|---|---|
| 2 | 325 | 5.0 | 513 | 531 | 27 | Δ |
| 2 | 325 | 20 | 507 | 523 | 28 | X * |
| 2 | 250 | 5.0 | 405 | 524 | 27 | Δ |

Bfr: Before heat treatment.
*: Out of the scope of the present invention.

EXAMPLE 3

Alloy No. 2 of the present invention was subjected to measuring of Vickers hardness of the surface layer under the conditions where the thickness of plating, heat treating temperature and treating time were changed. The results are shown in Table 4.

As is obvious from the data shown in Table 4, the surface hardness of the alloy is efficiently improved by conducting heat treatment according to the process of the present invention. This indicates that the alloy of the present invention has superior characteristics as a copper alloy for use in fabricating connectors and charging-sockets.

TABLE 4

| Plated Film Thickness (μm) | Treating Temperature & Time (° C., h) | Surface Hardness (Hv) |
|---|---|---|
| 2.5 | 200° C., 3h → 300° C., 2h | 490 |
| 2.5 | 325° C., 3h → 350° C., 2h | 501 |
| 1.2 | 150° C., 2h → 300° C., 4h | 465 |
| 1.2 | 200° C., 3h → 250° C., 2h | 410 |

EXAMPLE 4

Alloy No. 2 of the present invention as shown in Example 2 was subjected to Sn coating in the thickness of 2 μm followed by heat treatment at 350° C. for 8 hours. Some of the samples prepared as above were buffed to remove the top surface layer in the depth of 0.2 μm. The other samples were not subjected to buffing.

The surface roughness in terms of Rmax of the buffed samples was 2 μm, and that of the samples without buffing was 3.8 μm. The surface roughness in terms of Rmax of the ordinary Sn-plated samples without heat treatment was 2 μm.

In order to evaluate the alloy as a material for a terminal, alloy No. 2 of the present invention was pressed, and the friction and resistance to abrasion in repeated times of insertions and drawings were measured as following. Improvement of these characteristics of the alloy was what the present invention aimed at.

Alloy No. 2 of the present invention was pressed to form a female connector sample 1 having a female or spring portion 2 as shown in FIG. 1, and a male connector sample 3 having a male or spade portion 4 as shown in FIG. 2.

For the purpose of comparison, an alloy, having a composition of alloy No. 2, with ordinary Sn plating but without heat treatment was used as a prior art alloy.

The connector samples made from the prior art alloy, the invention alloy with buffing and the invention alloy without buffing were subjected to repeated insertions at a speed of 200 mm/min and the force of insertion was measured.

Figure 3:
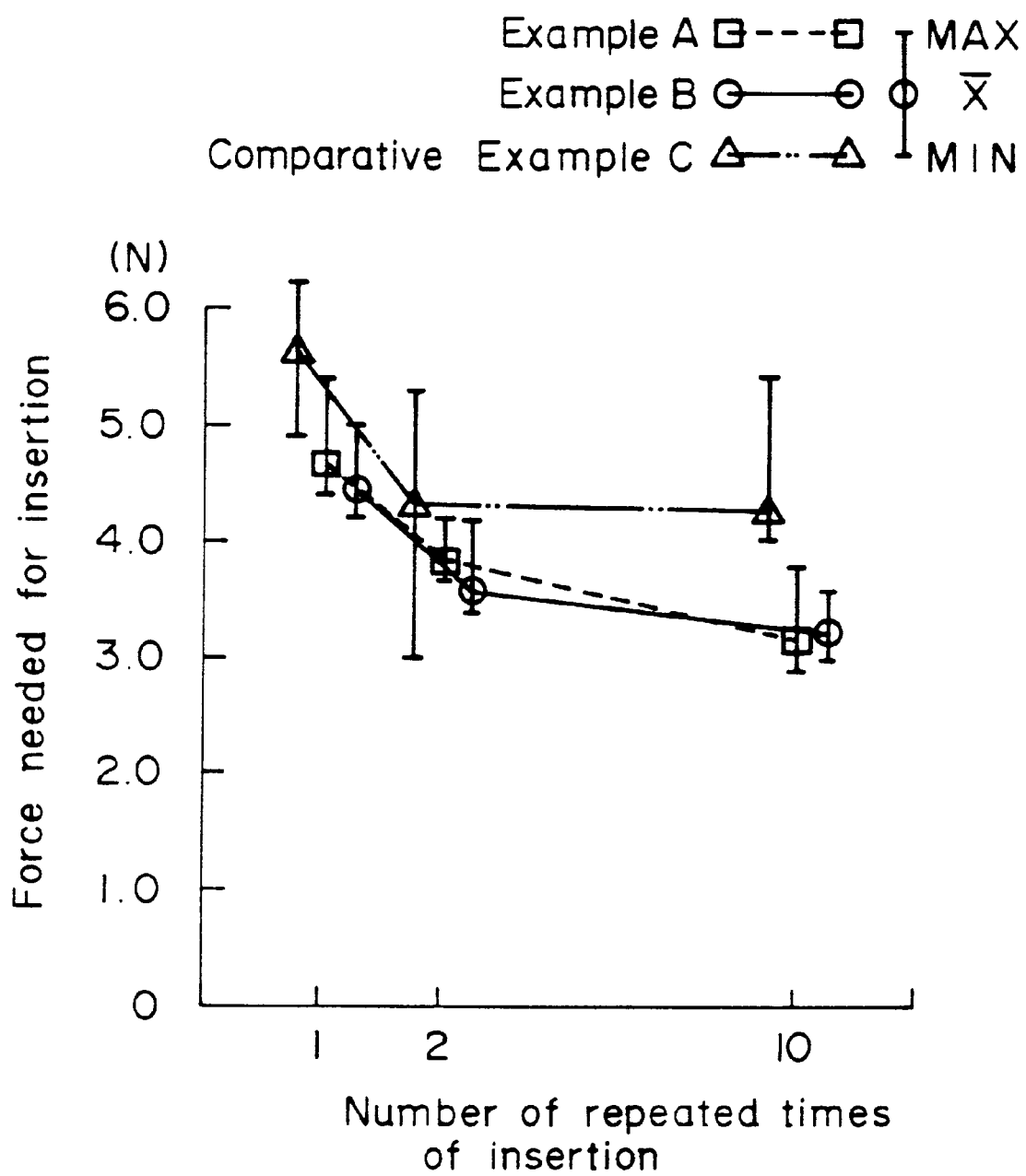
FIG. 3 is a graph showing the relationship between the number of repeated times of insertion and the force needed for the insertion, comparing the terminal of the present invention with that of the prior art.

The results are given in Table 5 and FIG. 3. Table 5 indicates that the force of insertion of the connector made from the invention alloy with heat treatment after surface treatment was lower than that of the connector made from the prior art alloy. FIG. 3 indicates that the scatter of the force of insertion of the connector made from the invention alloy was smaller than that of the connector made from the prior art alloy. The results also indicate that the force of insertion can be further reduced by buffing the alloys.

Since the alloy of the present invention shows a smaller and stabler variation of the force of insertion at repeated times of insertions and drawings, it is recognized to be superior in the resistance to abrasion.

Figure 4:
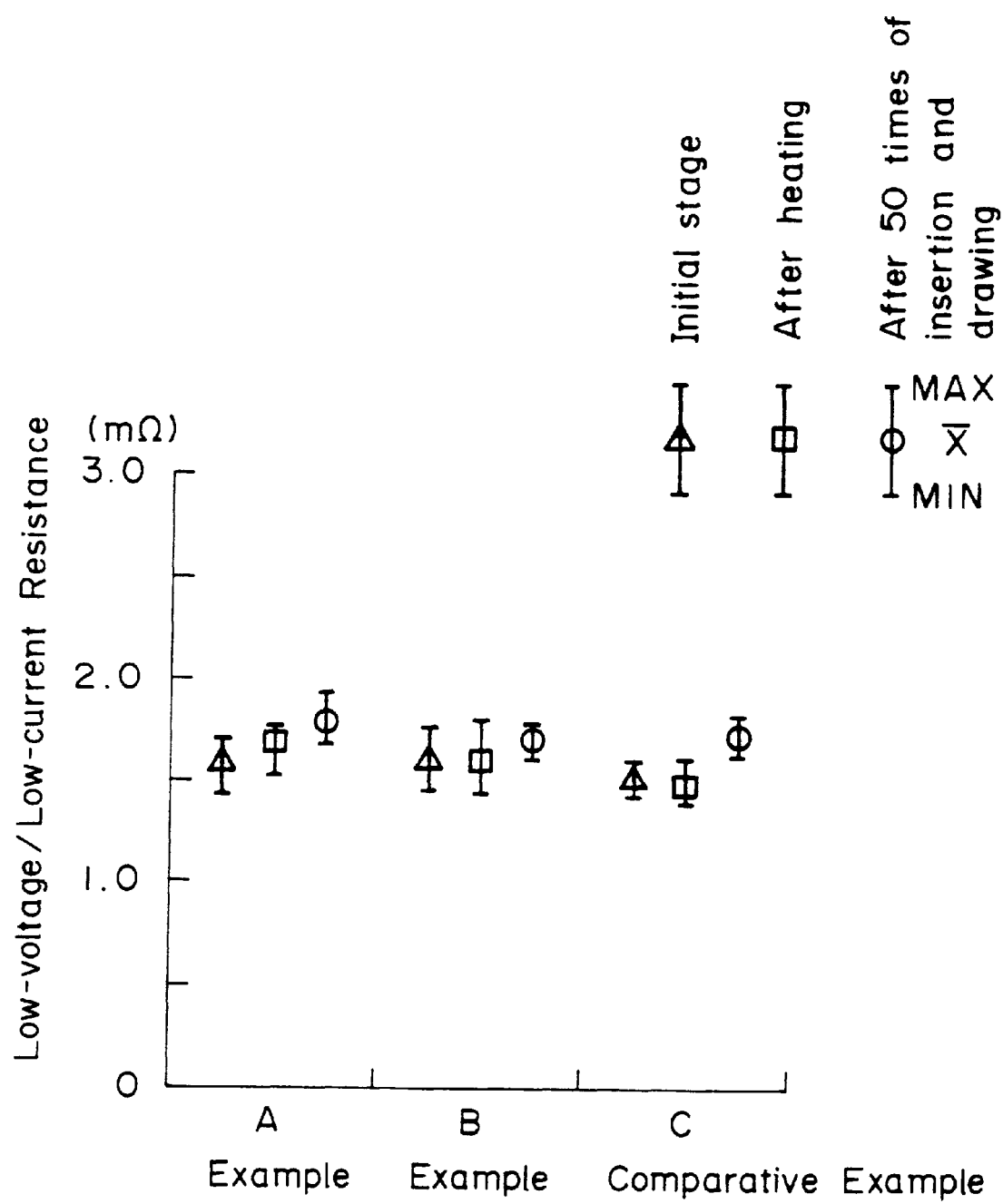
FIG. 4 is a graph showing low-voltage/low-current resistance of a connector terminal after 50 times of insertions and drawings, measured at the initial stage and the stage after heating at 100° C. for 100 hours, comparing the terminal of the present inention with that the prior art.

The low-voltage/low-current resistance of the connector samples was measured according to JIS-C-5402 at three different stages: (1) initial stage, (2) after heating at 100° C. for 100 hours, and (3) after 50 times of insertions and drawings. The results are given in Table 6 and FIG. 4. Both Table 6 and FIG. 4 indicate that the alloy of the present invention and the prior art alloy are virtually equal in low-voltage/low current resistance as the data of both alloys at above three stages are all within the range of 1–2 mΩ.

As is evident from the above, by using the alloy of the present invention, connector terminals having excellent characteristics can be obtained, with the force of insertion being reduced by 20% without increasing the resistance.

TABLE 5

| | | Number of Times of Insertions | Force of Insertion $\bar{x}$ (N) | Coefficient of Friction | Hardness (Hv) |
|---|---|---|---|---|---|
| Invention Examples | | | | | |
| A | Alloy No. 2 | 1 | 4.68 | 0.197 | 480 |
| | Sn-plated (2 μm) | 2 | 3.85 | 0.168 | |
| | Heat treated (without buffing) | 10 | 3.17 | 0.142 | |
| B | Alloy No. 2 | 1 | 4.46 | 0.188 | 440 |
| | Sn-plated (2 μm) | 2 | 3.60 | 0.157 | |
| | Heat treated (with buffing) | 10 | 3.25 | 0.145 | |
| Prior Art Examples | | | | | |
| C | Alloy No. 2 | 1 | 5.64 | 0.237 | 105 |
| | Sn-plated | 2 | 4.33 | 0.189 | |
| | (1 μm) | 10 | 4.30 | 0.180 | |

$\bar{x}$: Average of 10 data.

TABLE 6

(Unit: mΩ)

| | Initial Stage | After Heating at 100° × 100 h | After 50 times of Insertions |
|---|---|---|---|
| Invention Example A | 1.59 | 1.69 | 1.80 |
| Invention Example B | 1.61 | 1.60 | 1.72 |
| Prior Art Example C | 1.52 | 1.48 | 1.73 |

As is obvious from the stated examples, the copper alloys of the present invention are superior in the surface hardness and in contact resistance and have high strength, high elasticity and high electrical conductivity. They are also superior in amenability to bending work, and in the force of insertion. Therefore, they are excellent alloys capable of providing materials for making connectors matching the recent trend of high densification of electrical equipment of automobile, and for making electrical parts requiring high resistance to abrasion and corrosion.

What is claimed is:

1. A process for the production of a coated copper alloy comprising coating a surface of a copper alloy sheet with Sn, heat treating the Sn coated copper alloy at a temperature of 100 to 450° C. for a period of 0.5 to 24 hours to form a surface film and then removing 0.01 to 2 μm of the surface film, wherein said copper alloy consists essentially of 1 to 41 weight % Zn with the balance being Cu and incidental impurities.

2. The process for the production of a coated copper alloy according to claim 1, wherein said surface coating before the removing of the 0.01 to 2 μm of the surface film, has a thickness of between 0.5 and 10 μm.

3. The process for the production of a coated copper alloy according to claim 2, wherein said surface coating has a thickness of 1 to 5 μm.

4. The process for the production of a coated copper alloy according to claim 1, wherein said coated copper alloy has a surface roughness (Rmax) of not greater than 3 μm.

5. The process for the production of a coated copper alloy according to claim 1, wherein the heat treatment is carried out at a temperature of 200 to 400° C. and for a period of 1 to 3 hours.

6. The process for the production of a coated copper alloy according to claim 5, wherein the copper alloy has a composition selected from the group consisting of
   (a) 4.2 weight % Zn, 0.14 weight % Fe, 1.03 weight % Sn, 0.05 weight % P, with the remainder being Cu,
   (b) 4.1 weight % Zn, 0.18 weight % Fe, 1.94 weight % Sn, 0.04 weight % P, with the remainder being Cu,
   (c) 4.2 weight % Zn, 7.9 weight % Sn, 0.186 weight % P, with the remainder being Cu,
   (d) 4.3 weight % Zn, 0.2 weight % Mg, 0.09 weight % P, with the remainder being Cu, and
   (e) 1.9 weight % Zn, 0.15 weight % Al, 0.18 weight % Cr, with the remainder being Cu.

7. The process for the production of a copper alloy according to claim 1, wherein the Cu alloy has a low voltage/low current resistance of not greater than 2 mΩ.

8. The process for the production of a copper alloy according to claim 1, wherein the coated surface of the copper alloy has a Vickers hardness (Hv) of at least 300.

9. The process for the production of a copper alloy according to claim 8, wherein the coated surface of the copper alloy has a Vickers hardness of more than 400.

10. A process for the production of a coated copper alloy comprising coating a surface of a copper alloy sheet with Sn, heat treating the Sn coated copper alloy at a temperature of 100 to 450° C. for a period of 0.5 to 24 hours to form a surface film, and then removing 0.01 to 2 μm of the surface film, wherein said copper alloy consists essentially of 1 to 41 weight % Zn, 0.01 to 9 weight % in total of at least one element selected from the group consisting of Fe, Ni, Sn, Al, Co, Ti, Cr, Mg, Si and P, with the balance being Cu and incidental impurities.

11. The process for the production of a coated copper alloy according to claim 10, wherein said surface coating, before the removing of the 0.01 to 2 μm of the surface film, has a thickness of between 0.5 and 10 μm.

12. The process for the production of a coated copper alloy according to claim 11, wherein said surface coating has a thickness of 1 to 5 μm.

13. The process for the production of a coated copper alloy according to claim 10, wherein said coated copper alloy has a surface roughness (Rmax) of not greater than 3 μm.

14. The process for the production of a coated copper alloy according to claim 10, wherein said at least one element is selected from the group consisting of 0.01 to 5 weight % Fe, 0.01 to 9 weight % Ni, 0.11 to 9 weight % Sn, 0.01 to 9 weight % Al, 0.01 to 5 weight % Ti, 0.01 to 5 weight % Cr, 0.01 to 3 weight % Si and 0.01 to 0.5 weight % P.

15. The process for the production of a coated copper alloy according to claim 8, wherein the copper alloy has a composition selected from the group consisting of
   (a) 4.2 weight % Zn, 0.14 weight % Fe, 1.03 weight % Sn, 0.05 weight % P, with the remainder being Cu,
   (b) 4.1 weight % Zn, 0.18 weight % Fe, 1.94 weight % Sn, 0.04 weight % P, with the remainder being Cu,
   (c) 4.2 weight % Zn, 7.9 weight % Sn, 0.186 weight % P, with the remainder being Cu,
   (d) 4.3 weight % Zn, 0.2 weight % Mg, 0.09 weight % P, with the remainder being Cu, and
   (e) 1.9 weight % Zn, 0.15 weight % Al, 0.18 weight % Cr, with the remainder being Cu.

16. The process for the production of a copper alloy according to claim 10, wherein the heat treating is carried out at a temperature of 200 to 400° C. and for a period of 1 to 3 hours.

17. The process for the production of a copper alloy according to claim 10, wherein the copper alloy has a low voltage/low current resistance of not greater than 2 mΩ.

18. The process for the production of a copper alloy according to claim 10, wherein the coated surface of the copper alloy has a Vickers hardness (Hv) of at least 300.

19. The process for the production of a copper alloy according to claim 18, wherein the coated surface of the copper alloy has a Vickers hardness of more than 400.

* * * * *